United States Patent [19]
Scotto

[11] Patent Number: 6,112,761
[45] Date of Patent: Sep. 5, 2000

[54] FIRE HYDRANT LOCKING DEVICE AND WRENCH

[76] Inventor: Gary Scotto, 9 Steinberg Ave., Garfield, N.J. 07026

[21] Appl. No.: 09/440,182

[22] Filed: Nov. 15, 1999

[51] Int. Cl.[7] ............ F16K 35/06; F16K 35/10; E03B 9/06
[52] U.S. Cl. ............ 137/296; 70/178; 137/382; 137/800; 220/284; 220/725; 220/726
[58] Field of Search ............ 70/175, 176, 177, 70/178; 137/272, 296, 382, 382.5, 800; 220/284, 724, 725, 726; 251/291, 292

[56] References Cited

U.S. PATENT DOCUMENTS

| | | | |
|---|---|---|---|
| 468,781 | 2/1892 | Brentano | 137/296 |
| 468,782 | 2/1892 | Brentano | 137/296 |
| 3,456,463 | 7/1969 | Mihalich | 137/296 |
| 3,914,966 | 10/1975 | Bello | 70/163 |
| 3,929,152 | 12/1975 | Graham | 137/296 |
| 4,033,372 | 7/1977 | Bowman | 137/296 |
| 4,182,361 | 1/1980 | Oakey | 137/296 |
| 4,280,525 | 7/1981 | Byrnes | 137/296 |
| 4,379,469 | 4/1983 | Britz | 137/296 |
| 4,526,193 | 7/1985 | Drach | 137/296 |
| 4,602,654 | 7/1986 | Stehling et al. | 137/296 |
| 4,651,771 | 3/1987 | Borenstein et al. | 137/296 |
| 5,033,501 | 7/1991 | Stehling | 137/296 |
| 5,072,750 | 12/1991 | Poms et al. | 137/296 |
| 5,383,495 | 1/1995 | Kennedy | 137/296 |
| 5,469,724 | 11/1995 | Pollard | 70/178 |
| 5,520,210 | 5/1996 | Barton | 137/296 |
| 5,549,133 | 8/1996 | Sigelakis | 137/296 |
| 5,588,460 | 12/1996 | Meneses | 137/296 |
| 5,722,450 | 3/1998 | Julicher | 137/296 |

*Primary Examiner*—George L. Walton
*Attorney, Agent, or Firm*—Richard A. Joel, Esq

[57] ABSTRACT

A fire hydrant locking device comprises a clamp which engages the hydrant stem and includes apertured butterfly wings which are engaged by a forked rod locking the stem in a closed position. The rod extends through a donut to engage a tubular recess in the cap. Spring loaded curved pins engage the rod within the tubular recess and extend outwardly through the cap. A wrench having a circular recess with inward projections engages the cap pins to permit turning the threaded cap and permit access to the locked stem for actuation of the hydrant.

6 Claims, 3 Drawing Sheets

FIRE HYDRANT LOCKING DEVICE AND WRENCH

CROSS-REFERENCE TO RELATED APPLICATIONS

Not Applicable

STATEMENT REGARDING FEDERALLY SPONSORED RESEARCH OR DEVELOPMENT

Research and development of the present invention and application have not been Federally sponsored, and no rights are given under any Federal program.

BACKGROUND OF THE INVENTION

1. Field of the Invention

This invention relates to a fire hydrant locking device which is easy to install and very effective.

2. Description of the Realted Art Including Information Disclosed Under 37 CFR §§1.97-1.98

The unauthorized use of fire hydrants constitutes a great fire risk to dwellings and businesses due to low pressure in the system. There is also a waste of water which is costly and a severe problem during droughts. Another problem is the theft of water from fire hydrants for sale or recreational uses. It is therefore important to develop a locking device for fire hydrants which prevents unauthorized use of fire hydrants. Indeed a considerable body of prior art attempts to address this problem but the problem still exists and this invention is designed to provide a satisfactory cost saving solution.

The prior art includes U.S. Pat. No. 5,722,450 to JULICHER which relates to a tamper resistant construction for hydrants employing a shroud rotatably mounted on an end portion of the hydrant nut actuating body. In another approach, U.S. Pat. No. 5,588,460 to MENESES discloses an internally threaded tubular shield about the valve stem and a wrench having a pentagonal tubular socket to fit the keyway and the valve stem.

U.S. Pat. No. 5,549,133 to SIGELAKIS discloses a security device clamped between an outlet port of the hydrant and a cap for covering the outlet port while U.S. Pat. No. 5,520,210 to BARTON discloses a protective shield for a fire hydrant operating stem. The shield includes an inner ring with a peripheral groove which carries a snap ring. A standard authorized tool may be used in connection with the device.

U.S. Pat. No. 5,469,724 to POLLARD appears to be a standard locking device enclosing the operating nut of the hydrant. U.S. Pat. No. 5,383,495 to KENNEDY discloses a security hydrant cap having a domed body adapted to be removed only with a specialized tool and a surrounding slip ring substantially over the body. U.S. Pat. No. 4,033,501 to STEHLING discloses a fire hydrant cap and actuating tool which includes a gripper which fits under a slip ring to prevent the tool from slipping a spanner wrench and a hexagonal socket with a screw for gripping rounded off valve stems.

None of the above patents disclose the advantageous locking system proposed by applicant for fire hydrants. The considerable number of recent patents shows the interest and need in this area which the present invention is designed to meet.

SUMMARY OF THE INVENTION

This invention relates to a fire hydrant locking system including a cap and stem locking device to deter unauthorized use of fire hydrants. A clamp having butterfly wings including an aperture in each wing are mounted onto the hydrant stem. A forked rod extending outwardly on one end from a donut shaped member engages the apertures in the butterfly wings to lock the stem while the other elongated end of the rod extends outwardly from the donut on the opposite side thereof. A cap is mounted over the elongated portion of the rod and threaded onto a hydrant opening while spring loaded pins inside the cap are in an open position. When the cap is screwed onto the threads of the fire hydrant, a uniquely shaped wrench can be removed and the pins would be depressed and locked onto the rod. The cap is locked in place and cannot be removed unless the pins are squeezed with the unique wrench until they are in an open position. The stem will be prevented from turning unless the cap and fork are removed. This deters unauthorized use of the hydrant.

Accordingly, an object of this invention is to provide a new and improved locking system for fire hydrants.

Another object of this invention is to provide a new and improved design to lock the stem and cap of a fire hydrant to prevent unauthorized use.

A further object of this invention is to provide a new and improved fire hydrant locking device and a unique wrench which is used in conjunction therewith.

A still further object of this invention is to provide a new and improved locking system for fire hydrants which is readily adaptable to existing hydrants, inexpensive and readily locked and unlocked.

A more specific object of this invention is to provide a new and improved system which included a butterfly clamp engaged by a forked rod which is locked at the other end by spring loaded pins positioned in the cap and actuated by a wrench having a circular periphery and an aperture having inwardly projecting pins.

BRIEF DESCRIPTION OF THE DRAWINGS

The above and other objects and advantages of this invention may be more clearly seen when viewed in conjunction with the accompanying drawings wherein.

DETAILED DESCRIPTION OF THE INVENTION

Figure 1:
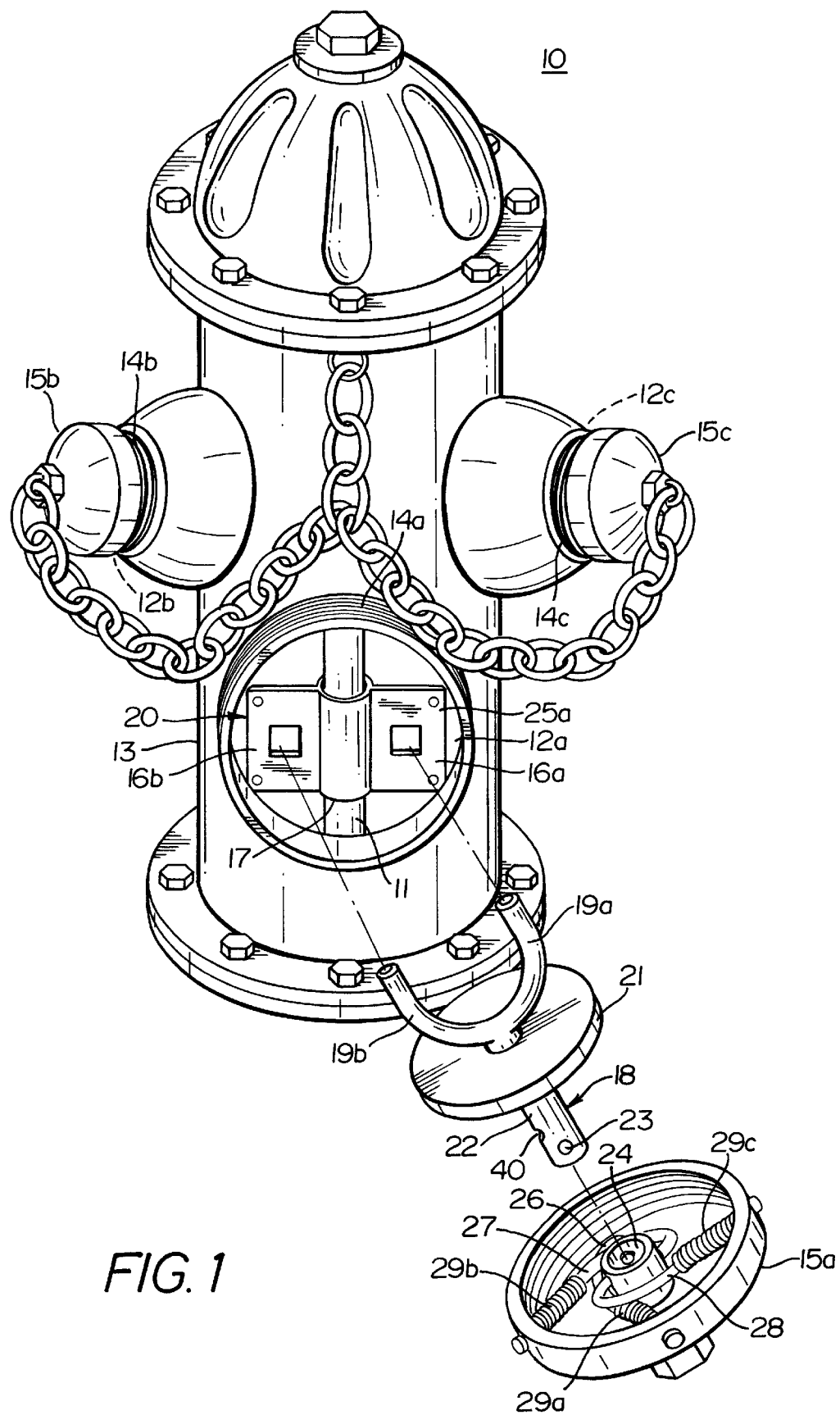
FIG. 1 is an exploded perspective view of the invention shown in connection with a fire hydrant.

Referring now to the drawings and particularly FIG. 1, a conventional fire hydrant 10 is shown. Since such fire hydrants and their operation are well-known, the hydrant 10 will not be described in detail. The hydrant 10 includes a stem 11 for actuating the flow of water from the hydrant 10 through outlets 12a–c. The main outlet 12a projects outwardly from the substantially cylindrical hydrant body 13 and includes a threaded outer periphery 14a. The outlets 12a–c are normally covered by caps 15a–c which engage the external threads 14a–c.

Figure 2:
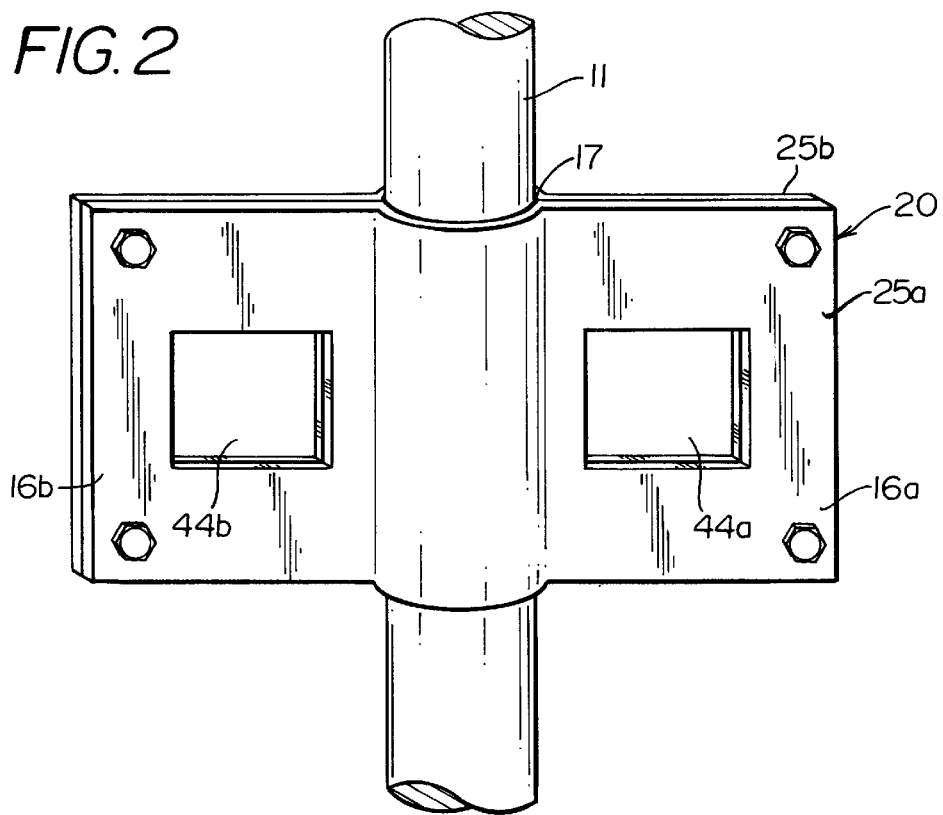
FIG. 2 is an enlarged view of the hydrant stem and clamp with butterfly wings mounted thereon.
Figure 3:
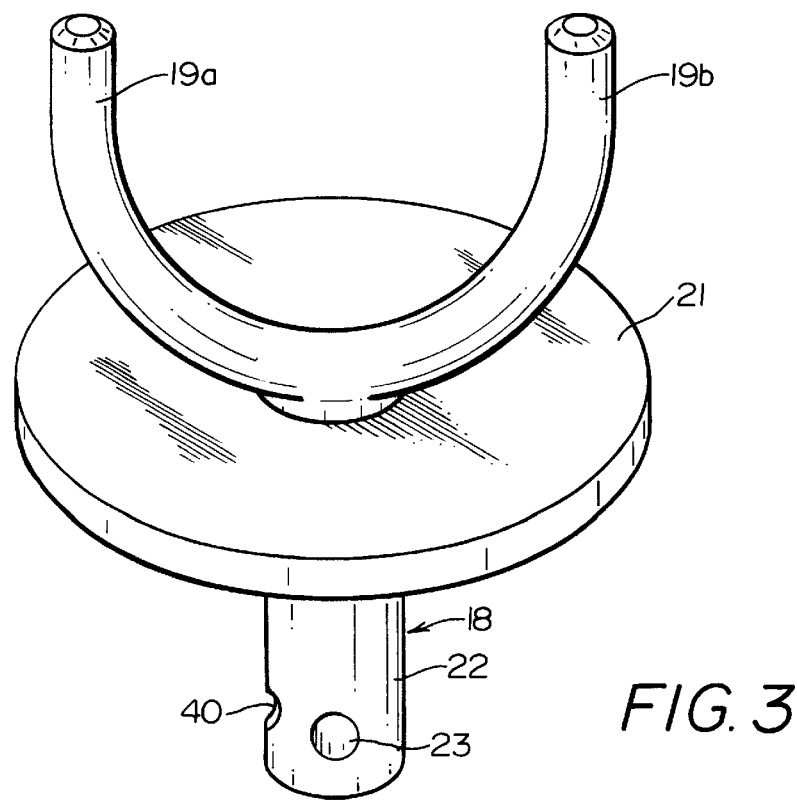
FIG. 3 is a perspective view of the forked rod and donut.
Figure 5:
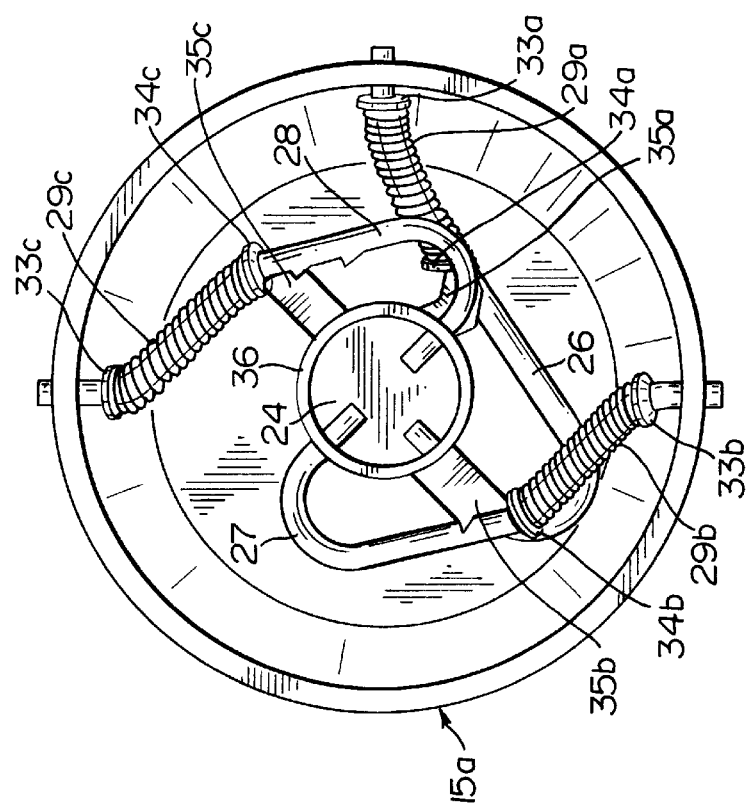

As shown in FIG. 2, a clamp 20 includes mating members 25a and 25b mounted together and forming butterfly wings 16a, 16b extending outwardly on both sides of an intermediate aperture 17. The stem 11 extends axially within the clamp aperture 17 and is locked in place by the clamp 20. A forked rod 18, shown in FIG. 3, is provided having legs 19a and 19b, an intermediate donut or flange member 21 and an outwardly extending elongated rod portion 22 which extends through donut 21 and includes intermediate recesses 23 and a notch 40. Each wing 16a, 16b includes an aperture 44a, 44b, respectively, which is engaged by the legs 19a, 19b of the forked rod 18 for purposes of locking the stem 11.

The rod portion 22 engages a tubular recess 24 in the cap 15a where it is gripped by inwardly extending curved pins 26, 27, 28 projecting through the tubular recess 24 to engage intermediate recesses 23. The pins 26–28 project outwardly through the cap 15a at their other end and include springs 29a–c mounted thereabout within the particular cap 15a–c. The pins 26–28 project outwardly through the cap 16a to be engaged by the wrench 20 shown in FIG. 4.

The uniquely curved pins include flange members 33a–c and 34a–c with the springs 29a–c mounted about the pins 26, 27, 28 to engage the respective flange members 33a–34a, 33b–34b and 33c–34c. Supports 35a–35c are mounted to the cylindrical wall 36 of the tubular recess 24 to engage the pins 26, 27 and 28, respectively.

Figure 4:
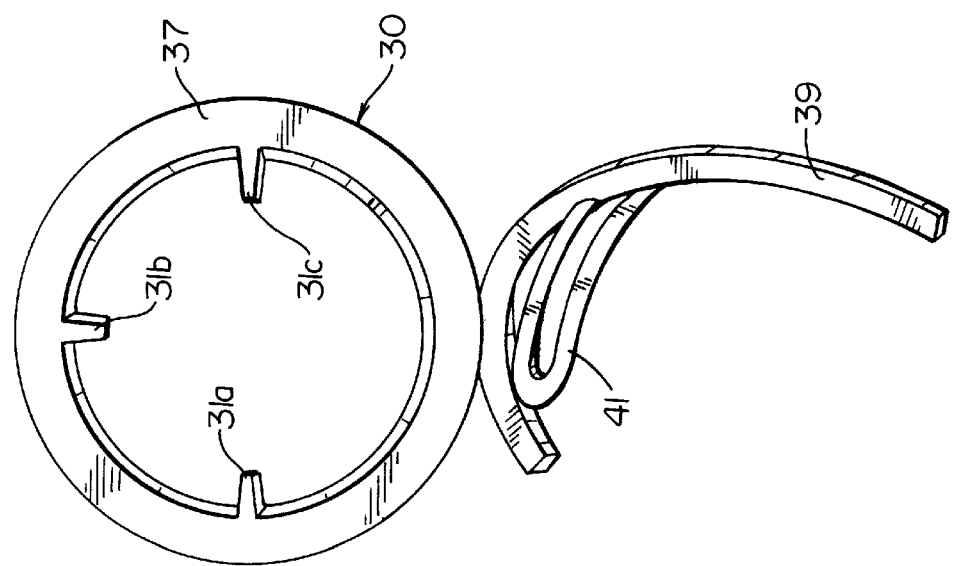
FIG. 4 is a perspective view of the unique wrench used in conjunction with the invention; and, FIG. 5 is a bottom view of the cap.

The wrench 30, shown in FIG. 4 includes a circular head 37 with aperture 38 having inwardly projecting tapered pins 31a–c to engage the projecting pins 26–28 in the cap 15a. A curved handle 39 is also mounted to the head 30 and includes a substantially U-shaped member 41 which braces the handle portion 42 against the main portion 43.

The cap 15a cannot be removed from the hydrant 10 unless the pins 26–28 are squeezed inwardly by the wrench 30 until they are in an open position. The stem 11 cannot be turned unless the cap 15a and fork 18 are removed by authorized personnel. To operate or unlock the fire hydrant 10, the wrench 30 is placed over the cap 15a and the pins 26–28 depressed by corresponding inward projections 31a–c on the inner circumference of the wrench aperture 38 to unlock the cap 15a. The cap 15a is then unthreaded and the donut 21 and forked rod 18 removed from the butterfly apertures to unlock the stem. The stem 11 may then be rotated conventionally to actuate the hydrant 12. After hydrant use, the locking system may be readily reinstalled.

While the invention has been explained by a detailed description of certain specific embodiments, it is understood that various modifications and substitutions can be made in any of them within the scope of the appended claims which are intended also to include equivalents of such embodiments.

What is claimed, is:

1. A fire hydrant locking device which locks the actuating hydrant stem and prevents access to the threaded outlet comprising:

a clamp having a central recess to engage the hydrant stem and outwardly extending wings, each wing having an aperture extending therethrough transversely to the stem;

a forked rod having a pair of legs at one end to engage the wing apertures and lock the stem in place and a main rod portion extending therefrom;

a movable donut having a central aperture with the main rod portion extending therethrough;

a cap having internal threads to engage the threaded outlet, a tubular recess having a cylindrical wall and a plurality of spring loaded curved pins passing through the cylindrical wall at one end to engage the rod which is mounted within the cylindrical wall and said curved pins extending through the at the other end; and, a wrench having a circular head, and aperture extending through said head and having inwardly projecting tapered pin portions and a curved handle mounted to said head;

wherein the wrench is mounted over the cap and when actuated depresses the spring-loaded cap pins out of engagement with the rod to permit turning the cap and access to the locking clamp for purposes of removing the forked rod from the wing apertures to unlock the actuating hydrant stem.

2. A fire hydrant locking device which locks the actuating hydrant stem and prevents access to the threaded outlet in accordance with claim 1 wherein:

the rod includes a plurality of spaced recesses each to be engaged by a corresponding spring loaded cap pin.

3. A fire hydrant locking device which locks the actuating hydrant stem and prevents access to the threaded outlet in accordance with claim 1 wherein:

the clamp comprises a pair of mating members each having a raised central portion which are mounted together to form a central recess engaging the stem.

4. A fire hydrant locking device which locks the actuating hydrant stem and prevents access to the threaded outlet in accordance with claim 1 wherein:

the curved pins each include a pair of spaced intermediate flanges and a coiled spring mounted about each of said pins between the flanges.

5. A fire hydrant locking device which locks the actuating hydrant stem and prevents access to the threaded outlet in accordance with claim 1 wherein:

the wrench further includes a curved handle mounted to the circular head and having a main handle portion and an integral curved portion extending outwardly from the head mounting and a substantially U-shaped support member mounted between the main handle and the curved portion.

6. A fire hydrant locking device which locks the actuating hydrant stem and prevents access to the threaded outlet comprising:

clamping means mounted to the stem having apertures extending therethrough;

a forked rod having a pair of legs at one end to engage the apertures in the clamping means to lock the stem in place;

a cap having a tubular recess to engage the rod and a plurality of spring loaded pins extending outwardly through the cap at one end and inwardly through the tubular recess to engage the rod; and, means mounted about the cap to actuate the pins out of engagement with the rod for permitting turning of the cap to permit access to the clamping means for purpose of removing the forked rod from the apertures to unlock the actuating hydrant stem and thereby unlock the hydrant.

* * * * *